April 6, 1937.  G. CARWARDINE  2,076,446
EQUIPOISING MECHANISM
Filed Jan. 17, 1935   3 Sheets-Sheet 1

INVENTOR
George Carwardine
BY
Franks. Appleman.
ATTORNEY

April 6, 1937.  G. CARWARDINE  2,076,446
EQUIPOISING MECHANISM
Filed Jan. 17, 1935  3 Sheets-Sheet 2
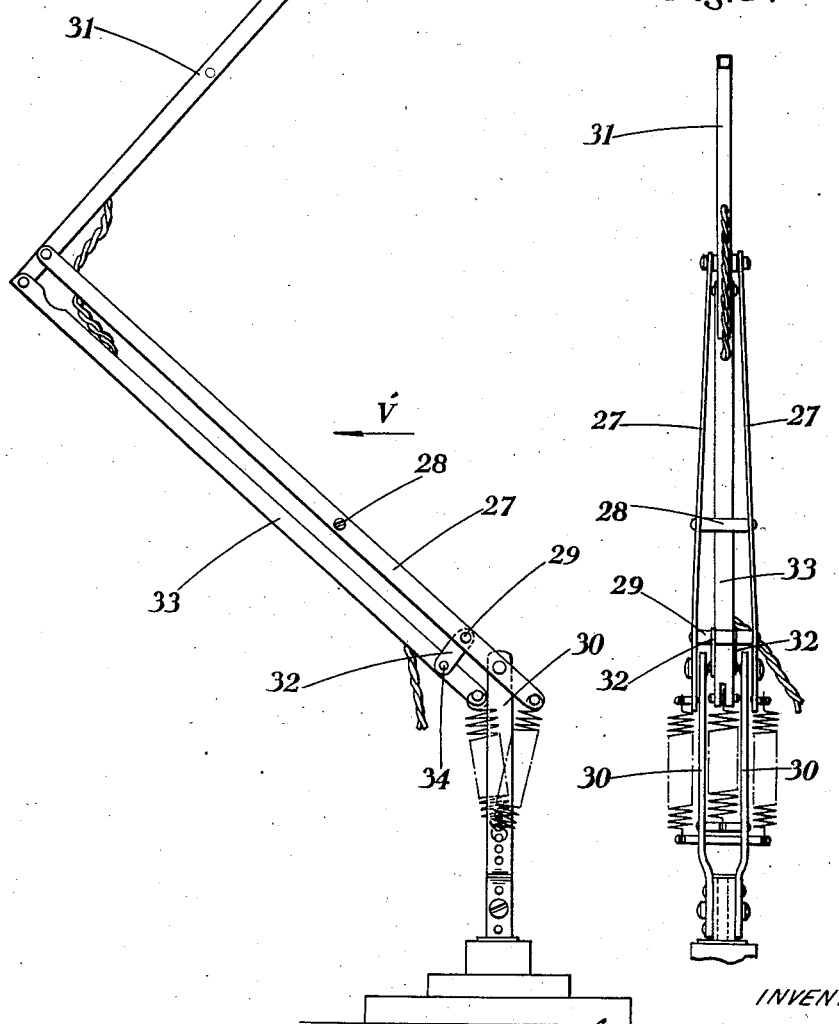

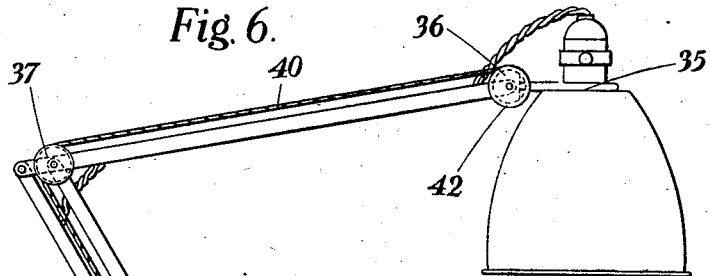
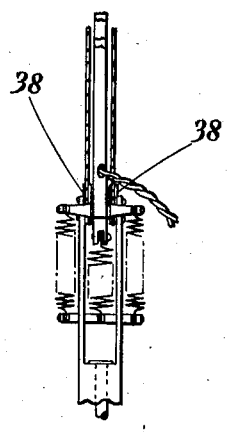
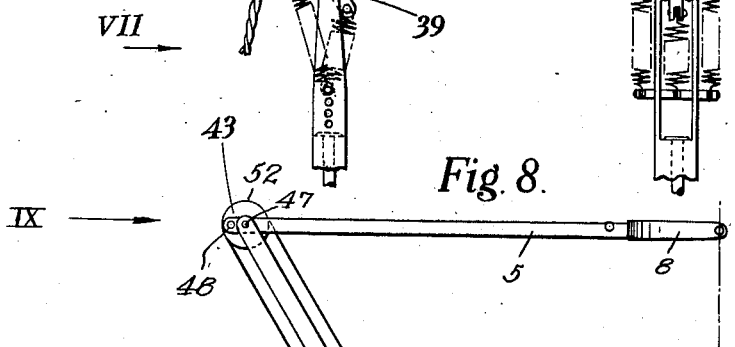
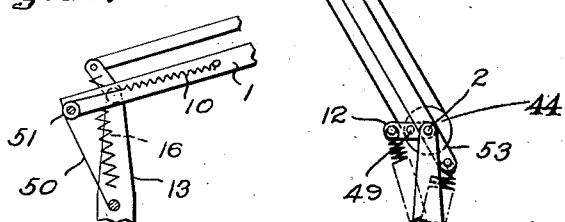
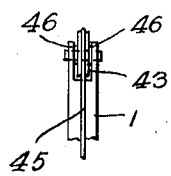

Patented Apr. 6, 1937

2,076,446

UNITED STATES PATENT OFFICE

2,076,446

EQUIPOISING MECHANISM

George Carwardine, Bath, England, assignor of one-half to Herbert Terry & Sons Limited, Redditch, England, a company of Great Britain Application January 17, 1935, Serial No. 2,260
In Great Britain February 10, 1934

14 Claims. (Cl. 248—280)

This invention relates to equipoising devices for enabling objects to be given displacements without apparent frictional restraint and to be held in equilibrium in any position within the range of the devices.

The invention aims at providing equipoising devices which have a very large range of movement and which are capable of remaining in any position in which they may be placed within such range of movement without the necessity of any clamping means or the like being manipulated.

One object of the invention is an equipoising device comprising in combination a support, a supporting lever pivoted about a horizontal axis to said support, a carrying lever for the object to be equipoised pivoted to said supporting lever about a horizontal axis remote from said first-mentioned axis, a subsidiary lever pivoted about a horizontal axis passing through said supporting lever, connecting means adapted to maintain said subsidiary lever and said carrying lever parallel in all operative positions of the device and two separate means operative to exert two forces arranged to balance on the one hand, said carrying lever and the object to be equipoised, and on the other hand, the whole of the device pivoted to said support, at least one of said two separate means consisting of at least one elastic member of such a characteristic and so attached to the device as to exert, in all positions of the device, a force substantially proportional to the distance between the terminal points between which the force is exerted. Thus, the supporting lever, the carrying lever and the subsidiary lever constitute part of a parallelogram linkage or equivalent mechanism pivoted as a whole to the support and this enables devices designed in accordance with the invention to have a very large range of movement. The said elastic member may be constituted by an overwound spring.

It is a further object of the present invention to provide means whereby the elastic member or members of an equipoising device may be conveniently located at a point remote from the mass or from a lever directly connected to the mass. For example, in the case of a lamp or microphone attached to a lever pivoted to a post or arm, it is sometimes desirable to arrange the elastic member or members, which balances the lever, at the end of the supporting arm remote from the lever, and the present invention provides means whereby this can be effected.

Thus, according to a further aspect of the present invention, an equipoising device comprises two levers connected together by means which maintain the levers parallel in all positions of the mechanism and in which the weight of the mass to be balanced is applied to one lever and a balancing force provided by an elastic member having the characteristic of exerting a force substantially proportional to its length or to the distance between the terminal points between which it exerts that force is applied to the other lever to maintain the mass equipoised in all its positions. In order to provide the device with a further degree of freedom, the weighted lever may conveniently be mounted on a supporting lever which is pivoted about a horizontal axis and which forms part of a second equipoising system arranged so that the supporting lever is in equilibrium when in various positions in a vertical plane to which the axis of the supporting lever is perpendicular. The linkage device for maintaining the weighted lever and the second lever parallel to each other may consist of a parallelogram linkage, in which case the weighted lever and the second lever provide two parallel sides of the parallelogram linkage. Alternatively, the second lever and the weighted lever may be kept parallel through the medium of two pulley wheels, one fixed to each lever, and a flexible strip embracing the pulleys, each pulley wheel having its axis on the fulcrum of its respective lever. In this case, when the weighted lever is mounted on an equipoised supporting lever, the latter is arranged so that it has its fulcrum at the axis of the second lever and of the pulley wheel attached thereto and the axis of the pulley wheel attached to the weighted lever is at the joint between the supporting lever and the weighted lever.

When an equipoised supporting lever is used, the latter may be balanced by means of at least one elastic member which acts between a fixed anchor point and the supporting lever and which has the characteristic of exerting a force substantially proportional to its length or to the distance between the terminal points between which it exerts that force.

The weighted lever may be attached to a pillar or column and the pillar or column may consist of a lever pivoted about a horizontal axis at which sufficient frictional restraint is provided to hold the lever in a predetermined position. This frictional restraint may exist as a result of a screw being tightened against a bearing so that when the screw is released, the friction is reduced sufficiently to enable the lever to be moved to another position at which it may be fixed by again tightening the screw.

Equipoising mechanism according to the invention may be arranged to be suspended from a ceiling or attached to a bracket projecting from a wall and supporting a vertical member to which the second lever is pivoted and to which a supporting lever, which may itself form part of an equipoising system, is also pivoted.

In order that the invention may be clearly understood and readily carried into effect, some mechanisms constructed in accordance therewith will now be described by way of example, with reference to the accompanying drawings, in which:—

Figure 4 shows a further modification of the mechanism shown in Figure 1;

Figure 5 shows a view of part of the mechanism shown in Figure 4, when viewed in the direction of the arrow V;

Figure 6 shows another modification of the mechanism shown in Figure 1;

Figure 7 shows a view of part of the mechanism shown in Figure 6, when viewed in the direction of the arrow VII;

Figure 8 shows yet another modification of the mechanism shown in Figure 1;

Figure 9 shows a detail of the modification shown in Figure 8 as seen when looking in the direction of the arrow IX in Figure 8; and Figure 10 shows a further modification of the mechanism shown in Figure 1.

Figure 1:
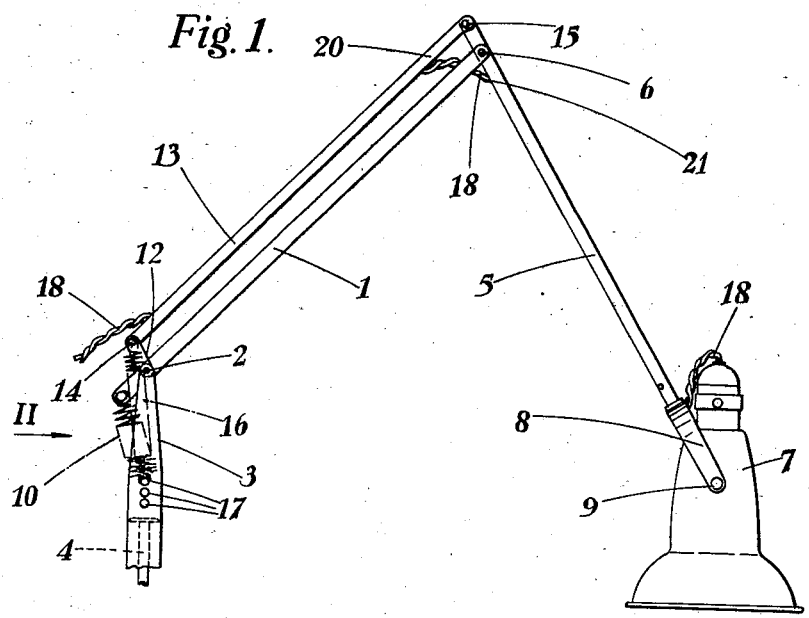
Figure 1 shows an elevation of equipoising mechanism supporting a lamp.
Figure 2:
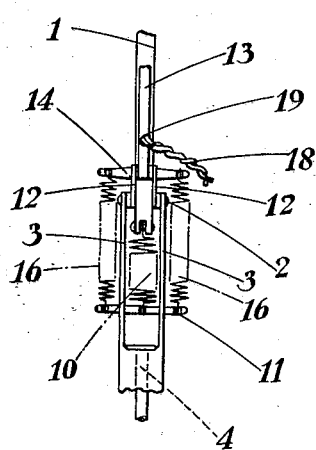
Figure 2 shows a view of part of the mechanism shown in Figure 1, when viewed in the direction of the arrow II.

Referring to Figures 1 and 2, a supporting lever 1 of the first order characteristic, hereinafter referred to as the supporting lever, is pivoted about a horizontal spindle 2 extending between the upper ends of two prongs 3 of a vertical forked member. The latter is free to turn about a vertical spindle 4 fixed to a heavy base (not shown) which serves as the support for the whole mechanism. A carrying or weighted lever 5 of the first order characteristic is pivoted about a horizontal axis 6 to one end of the first lever 1. This lever is weighted at one end by a lamp 7 which it carries in a fork 8. The lamp 7 can be turned about a horizontal axis 9 extending between the ends of the prongs of the fork 8 and passing through the centre of gravity of the lamp. The weight of the lamp 7, of the lever 5, and of the parts attached to them, is balanced by a spring 10 which is hinged at one end to the end of the supporting lever 1 remote from the axis 6, and at the other end to a horizontal rod 11 which lies in the same vertical plane as the spindle 2 and which passes through holes in the prongs 3. The spring 10 is an overwound helical spring which is so wound that the force exerted by it is proportional to its length and the ends of the spring 10 are so hinged that the spring remains straight in all positions of the first lever 1, so that the force of the spring always acts in a straight line passing through its hinged ends. Thus, when the first lever 1 is put in any angular position relatively to the prongs 3, the spring 10 maintains it in that position and there is no tendency for the first lever 1 to move to another position, the strength of the spring being, of course, appropriately chosen.

The angular position of the weighted lever 5 relatively to the supporting lever 1 is controlled through the medium of a second or subsidiary lever which consists of two short links 12. These links 12 are arranged one on each side of the supporting lever 1 and are pivoted about the same spindle 2. The ends of the links 12 remote from the spindle 2 lie one on each side of one end of a link 13 and are pivoted to the latter through the medium of a horizontal rod 14 which passes through the links 12 and 13. The link 13 connects the links 12 with the end of the weighted lever 5 remote from the lamp, the link 13 being pivoted to the weighted lever 5 about a horizontal axis 15. The distance between the axes 6 and 15 is equal to the distance between the spindle 2 and the bar 14, and the distance between the bar 14 and the axis 15 is equal to the distance between the spindle 2 and the axis 6 so that a parallelogram linkage is provided and the second lever, i. e. the links 12, remain parallel to the weighted lever 5 in all positions of the mechanism. The turning moment which tends to cause the lamp 7 to swing about the axis 6, is balanced by two overwound springs 16, each of which is hinged at one end to the bar 11 and at the other end to the bar 14. Like the spring 10, these springs 16 are helical springs which are so wound that the force exerted by them is proportional to their length. This characteristic enables the springs 16 to maintain the weighted lever 5 in any angular position relatively to the supporting lever 1 without there being any tendency for the weighted lever 5 to move to another position, the strength of the springs being, of course, appropriately chosen.

It will now be seen that the lamp 7 can be given three dimensional displacements and that it will remain in equilibrium in any position within the range of the mechanism.

The lamp 7 is frictionally mounted on the fork 8 so that when the lamp 7 is turned about the axis 9 it remains in the position to which it is turned. As the axis 9 passes through the centre of gravity of the lamp, such movements do not upset the equilibrium of the mechanism. The fork 8 may be mounted so that it can be turned about the axis of the weighted lever 5. In this case, the lamp 8 may also be turned in a plane perpendicular to the weighted lever 5, and friction may be provided between the fork 8 and weighted lever 5 so that the lamp will stay in any position in this plane.

The action of the springs may be adjusted by altering the position in a vertical plane of the rod 11 and for this purpose the prongs 3 are each drilled with a number of holes 17, each hole in one prong being horizontally opposite a hole in the other prong. The rod 11 may be put through any one of the pairs of horizontally opposite holes. In an alternative arrangement, the action of the springs 16 may be adjusted by means of screws to which the lower ends of the springs are attached and which can be screwed up or down in bosses fixed to the forked member. A similar arrangement may be provided for the spring 10.

The weighted lever 5 and the link 13 are tubes of square section and conductors 18 for supplying electric current to the lamp 7 pass through these tubes, the conductors entering the link 13 through a hole 19 (Figure 2), leaving the link 13 through a hole at 20, entering the weighted lever 5 through a hole at 21, and leaving the weighted lever 5 at the end thereof between the prongs of the fork 8.

Figure 3:
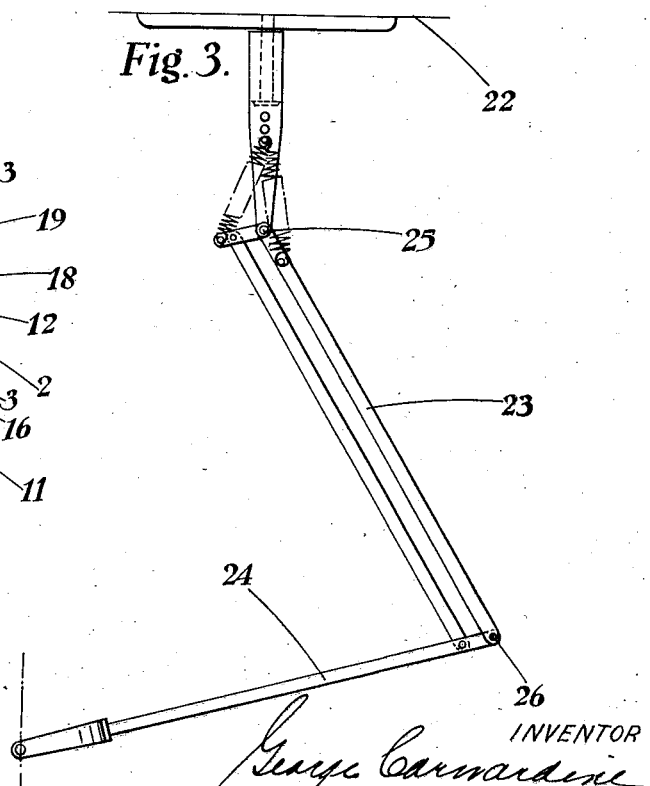
Figure 3 shows a modification of the mechanism shown in Figure 1.

In the arrangement shown in Figure 3, the mechanism is arranged so that the lamp (not shown) is supported from a ceiling 22. In this arrangement, the mechanism is substantially equivalent to that shown in Figures 1 and 2, but the supporting lever 23 and the carrying or weighted lever 24 are levers of the second order, the fulcrum of each being located at its end (at 25 and 26 respectively).

In the arrangement shown in Figures 4 and 5 the supporting lever is mechanically the same as the supporting lever in the mechanism shown in Figures 1 and 2, but structurally it is different. It consists of two flat strips 27 connected by rods 28 and 29. Each strip is pivoted independently to one prong 30 of the forked member, the pivots being, of course, on the same horizontal axis. The strips 27 converge to the weighted lever 31 and are pivoted one on each side of the latter. The chief difference, however, between the construction shown in Figures 4 and 5 and that shown in Figures 1 and 2 is that the second lever is not pivoted to the supporting lever at the axis about which the supporting lever is pivoted to the forked member, but is pivoted to the supporting lever about the rod 29. Also the subsidiary or second lever, which consists of links 32, is not pivoted to the end of the link 33, connecting the links 32 with one end of the carrying or weighted lever 31, but to an axis 34 which is the same distance from the joint between the link 33 and the weighted lever 31 as the shortest distance between the rod 29 and the joint between the supporting lever and the weighted lever 31. Thus, as the distance between the pivots of each link 32 is the same as the distance between the two aforementioned joints, the second lever always remains parallel to the weighted lever 31. Further, the length of the link 33 is the same as the distance between the fulcrum of the supporting lever and the joint between the latter and the weighted lever 31. The arrangement is, therefore, such that the action of the mechanism is the same as that of the mechanism shown in Figures 1 and 2.

It will be seen that in the construction shown in Figures 4 and 5, the supporting lever is balanced by two springs, one being located on each side of the forked member and each spring being attached to one of the strips 27. The balancing spring for the turning moment of the weighted lever lies between the prongs of the forked member and is attached at one end of the link 33.

Figures 6 and 7 show an arrangement embodying levers, links and springs disposed exactly as in Figures 1 and 2, and additional mechanism for maintaining the axis of the lamp vertical in all positions of the end of the carrying or weighted lever. In this case, the lamp is fixed to a horizontal arm 35 which is rigidly fixed, at one end, between two parallel pulley wheels 36 pivoted to the end of the weighted lever, one pulley wheel being located on each side of the lever. The arrangement, therefore, is such that the pulley wheels 36 and the arm 35 are rigidly fixed together and can rotate as a whole about the axis of the pulley wheels relatively to the weighted lever. Two pulley wheels 37 are pivoted at the pivotal joint between the supporting lever and the weighted lever, one pulley wheel 37 being located at each side of the joint. Two further pulley wheels 38 are mounted co-axially with the fulcrum of the supporting lever, one on each side of the latter, and are fixed by pins 39 to the prongs of the forked member so that the pulley wheels 39 cannot rotate relatively to the forked member. Two cables 40 connect the pulley wheels 36 and 38, the cables being fixed at 41 and 42 to the pulley wheels. One cable 40 connects the pulley wheels on one side of the supporting and weighted levers and the other cable 40 connects the pulley wheels on the other side of these levers. Considering one of the cables 40, it is fixed at one end to its respective pulley wheel 38 at 41. It then passes round part of the circumference of the pulley wheel. Thence it travels parallel to the supporting lever to its respective pulley wheel 37. The latter changes its direction so that it travels parallel to the weighted lever. Finally, after passing round part of the circumference of its respective pulley wheel 36, it is anchored to the latter at 42.

The device shown in Figures 8 and 9 is identically similar to that shown in Figures 1 and 2 except for the means by which parallelism is maintained between the carrying or weighted lever 5 and the subsidiary or second lever constituted by the links 12. The square section tube, constituting the weighted lever 5, has its upper and lower surfaces cut away at the end remote from the fork 8 so that its lateral surfaces constitute a fork 46 (Figure 9) within which a pulley wheel 43 is mounted. A pin 47, which constitutes the pivotal axis about which the weighted lever 5 swings relatively to the supporting lever 1, passes through the pulley wheel 43 and supports it axially. The pulley wheel 43 is prevented from turning relatively to the weighted lever 5 by a pin 48 which passes through the pulley wheel 43 and the fork 46. Thus the pulley wheel 43 rotates with the weighted lever 5 about the pin 47, relatively to the supporting lever 1. A pulley wheel 44 is mounted between the side surfaces of the square tube constituting the supporting lever 1, the front and back surfaces of the tube being cut away to accommodate the pulley wheel 44. The spindle 2, by means of which the supporting lever 1, the links 12 and the prongs 3 of the forked member are pivotally connected, passes axially through the pulley wheel 44 and supports it within the supporting lever 1. A pin 49 passes through the links 12, constituting the second lever, and through the pulley wheel so that the latter rotates with the second lever as a unit, relatively to the supporting lever 1. The pulley wheels 43 and 44 are of equal diameter and a cable 45 embraces them tightly and is pinned to them at points 52 and 53 so that when the weighted lever is made to undergo an angular displacement relatively to the supporting lever an exactly similar angular displacement is transmitted to the second lever.

Figure 10 shows a further modification of the construction shown in Figure 1. In this case the tubular supporting lever 1 houses the spring 10, the latter being fixed at one end within the tube and extending along the tube to a cable 50 to which its other end is attached. The cable passes round a small pulley wheel 51 at the end of the supporting lever remote from the weighted lever, and then passes straight to the bar 11 to which it is fixed. In this case the spring 10 is arranged to exert a force which is proportional to the distance between the small pulley wheel and the point where the cable is anchored to the bar 11. The spring 10 may be an ordinary spring in which the stress is proportional to its extension but the springs 16 are overwound springs having the same characteristics as those used in the device shown in Figure 1.

In each of the foregoing forms it will be seen that the longer arm of each lever constitutes a load arm and the shorter arm of each lever constitutes a power arm. The arrangement in each case is that the load on the first lever has a moment arm whose horizontal component varies as the angle between the lever and a vertical line through its pivotal axis varies. The same is true of the second lever with reference to a vertical line passing through its pivotal axis.

I claim:

1. An equipoising device comprising a support, a supporting lever pivoted about a horizontal axis to said support, a lever pivoted to said supporting lever and adapted to carry the object to be equipoised, a second lever pivoted to said supporting lever about an axis remote from the axis of said carrying lever, means for maintaining said carrying lever and said second lever parallel in all operative positions of the device and two separate means operative to exert two forces arranged to balance on the one hand said carrying lever and the object to be equipoised and on the other hand the whole of the device pivoted to said support, one of said two separate means comprising an elastic member applied to said second lever and having the characteristic of exerting a force substantially porportional to the distance between the terminal points between which it exerts that force.

2. An equipoising device comprising in combination a support, a supporting lever pivoted about a horizontal axis to said support, a carrying lever pivoted about a horizontal axis on said supporting lever and adapted to receive the object to be equipoised, a second lever pivoted to said supporting lever about a horizontal axis remote from said axis of said carrying lever, means for maintaining said carrying lever and said second lever parallel in all operative positions of the device, and two separate means operative to exert two forces arranged to balance on the one hand said carrying lever and the object to be equipoised and on the other hand the whole of the device pivoted to said support, one of said two separate means comprising an elastic member applied to said supporting lever and having the characteristic of exerting a force substantially proportional to the distance between the terminal points between which it exerts that force.

3. An equipoising device comprising in combination, a supporting arm, a carrying lever to which the weight to be balanced is applied pivoted to said supporting arm about a horizontal axis, a second lever pivoted to said supporting arm about a horizontal axis remote from said first-mentioned axis, means connecting said carrying lever and said second lever so as to maintain them parallel in all positions and an elastic member having the characteristic of exerting a force substantially proportional to the distance between the terminal points between which it exerts that force, being applied to said second lever, so as to balance the weight applied to said carrying lever in all positions of the latter.

4. An equipoising device comprising in combination, a support, a supporting lever pivoted about a horizontal axis to said support, a carrying lever adapted to support the weight to be balanced pivoted to said supporting lever about a horizontal axis remote from said first-mentioned axis, a second lever pivoted to said supporting lever at said first-mentioned axis, means for maintaining said carrying lever and said second lever parallel in all positions of the device, a spring adapted to equipoise said supporting lever in various angular positions about its axis and an elastic member being connected between a point on said second lever and a point on a vertical plane containing the axis of said second lever and said supporting lever, said elastic member itself being in a vertical plane at right angles to said aforementioned vertical plane and having the characteristic of exerting a force which is substantially proportional to its length.

5. An equipoising device comprising in combination, a support, a supporting lever pivoted about a horizontal axis to said support, a carrying lever adapted to support the weight to be balanced pivoted to said supporting lever about a horizontal axis remote from said first-mentioned axis, a second lever pivoted to said supporting lever at said first-mentioned axis, means for maintaining said carrying lever and said second lever parallel in all positions of the device, an elastic member being connected between a point on said second lever and a point on a vertical plane containing the axis of said second lever and said supporting lever, said elastic member itself being in a vertical plane at right angles to said aforementioned vertical plane and having the characteristic of exerting a force which is substantially proportional to its length, and at least one elastic member connected to said supporting lever and to a point fixed relatively to the axis of said supporting lever, said spring having the characteristic of exerting a force substantially proportional to the distance between the terminal points between which it exerts that force and being thereby adapted to maintain said supporting lever stationary in various angular positions about its axis.

6. An equipoising device comprising in combination, a support, a supporting lever pivoted about a horizontal axis to said support, a carrying lever, adapted to support the object to be equipoised, pivoted to said supporting lever about a horizontal axis remote from said first-mentioned axis, a second lever pivoted to said supporting lever at a point intermediate said axis between said supporting lever and said carrying lever and said axis between said supporting lever and said support, a link connecting said carrying lever and said second lever so that said second lever and said carrying lever remain parallel in all positions, an elastic member arranged to act between a point on an extension of said link and a point in a vertical plane containing the axis of said supporting lever, said points being located so that a line joining them is in a vertical plane at right angles to said aforementioned vertical plane, said elastic member having the characteristic of exerting a force which is proportional to the distance between said points, so that said carrying lever is balanced in all operative positions, and means for balancing said supporting lever in an infinite number of angular positions about its axis.

7. An equipoising device comprising in combination, a support, a supporting lever pivoted about a horizontal axis to said support, a carrying lever, adapted to support the object to be equipoised, pivoted to said supporting lever about a horizontal axis remote from said first-mentioned axis, a second lever pivoted to said supporting lever at a point intermediate said axis between said supporting lever and said carrying lever and said axis between said supporting lever and said support, a link connecting said carrying lever and said second lever so that said second lever and said carrying lever remain parallel in all positions, an elastic member arranged to act between a point on an extension of said link and a point in a vertical plane containing the axis of said supporting lever, said points being located so that a line joining them is in a vertical plane at right angles to said aforementioned vertical plane, said elastic member having the characteristic of exerting a force which is proportional to the distance between said points, so that said carrying lever is balanced in all operative positions, and means, serving to balance said supporting lever and the attachments thereto, comprising an elastic member, having the characteristic of exerting a force which is substantially proportional to the distance between said points, connected between a point on said supporting lever and a point in said plane containing said axis of said supporting lever, the line joining said points itself being in a vertical plane at right angles to said first-mentioned plane.

8. An equipoising device comprising in combination, a support, a supporting lever pivoted to said support about a horizontal axis, a pulley wheel having its axis coincident with said horizontal axis, said pulley wheel being fixed relatively to said support, an intermediate lever pivoted to said supporting lever about a horizontal axis, a second pulley wheel freely pivoted about said last-mentioned axis, a third pulley wheel freely pivoted about a horizontal axis, remote from said axis between said intermediate lever and said supporting lever, on said intermediate lever, an object fixed to said third pulley wheel, a flexible member adapted, by being fixed to said first pulley wheel and to said third pulley wheel and passing over said second pulley wheel, to maintain said object in a constant angular position for various positions of said supporting lever and said intermediate lever, a second lever pivoted to said supporting lever about a horizontal axis remote from said axis between said intermediate lever and said supporting lever, means for maintaining said intermediate lever and said second lever parallel in all positions of the device, balancing means adapted to apply a force to said second lever so as to maintain said intermediate lever balanced in all positions of the device and balancing means adapted to apply a force to said supporting lever so as to maintain the latter balanced in all positions of the device, at least one of said balancing means consisting of at least one overwound spring.

9. An equipoising device comprising a forked supporting member formed with two vertical prongs, a supporting lever pivoted about a horizontal axis to the end of said support, a carrying lever, to which the object to be equipoised is applied, pivoted to said supporting lever about a horizontal axis remote from said first-mentioned axis, a second lever pivoted to said supporting lever, means for maintaining said second lever and said carrying lever parallel in all positions of the device and three springs each having the characteristic of exerting a force substantially proportional to its length, being adapted to maintain the device in equilibrium by acting on said supporting lever and said second lever, and being arranged so that one of said springs lies between planes containing said prongs and the other two springs lie outside the space between said planes, one on each side of the central spring.

10. An equipoising device comprising in combination, a supporting member, a supporting lever pivoted about a horizontal axis to said supporting member, a carrying lever, to which the object to be equipoised is applied, pivoted to said supporting lever about a horizontal axis remote from said first-mentioned axis, a second lever pivoted to said supporting lever about a horizontal axis remote from said axis between said carrying lever and said supporting lever, means for maintaining said carrying lever and said second lever parallel in all positions of the device, a member attached to said supporting member and adapted to hold the ends of springs in a vertical plane containing said axis of said supporting lever, means for adjusting the effective vertical distance between said member and said axis of said supporting member and springs each having the characteristic of exerting a force substantially proportional to the distance between the points between which it exerts that force attached to said member and to said supporting lever and said second lever so as to maintain the device in equilibrium in all operative positions thereof.

11. An equipoising device comprising in combination a support, a supporting lever pivoted about a horizontal axis to said support, a carrying lever for the object to be equipoised pivoted to said supporting lever about a horizontal axis remote from said first-mentioned axis, a subsidiary lever pivoted about a horizontal axis passing through said supporting lever, means adapted to maintain said subsidiary lever and said carrying lever parallel in all operative positions of the device and two separate means, at least one of which comprises an overwound spring, operative to exert two forces arranged to balance on the one hand, said carrying lever and the object to be equipoised, and on the other hand, the whole of the device pivoted to said support.

12. An equipoising device comprising in combination a support, a supporting lever pivoted about a horizontal axis to said support, a carrying lever for the object to be equipoised pivoted to said supporting lever about a horizontal axis remote from said first-mentioned axis, a subsidiary lever pivoted about a horizontal axis passing through said supporting lever, means adapted to maintain said subsidiary lever and said carrying lever parallel in all operative positions of the device and two separate means operative to exert two forces arranged to balance on the one hand, said carrying lever and the object to be equipoised, and on the other hand, the whole of the device pivoted to said support, at least one of said two separate means comprising an elastic member of such a characteristic and so attached to the device as to exert, in all positions of the device, a force substantially proportional to the distance between the terminal points between which the force is exerted.

13. An equipoising device including a support, a lever pivoted intermediate its ends to said support and having a load arm and a power arm, a second lever pivoted intermediate its ends to the end of the load arm of the first lever, the pivots of the first and second levers being parallel, a load carried by the extremity of the load arm of the second lever, an auxiliary lever pivoted to the support coaxially with the pivot of the first lever, a linkage connecting the power arm of the second lever with the auxiliary lever to hold the two in parallelism, power means carried by the extremity of the power arm of said first lever and arranged to vary the power effect on said power arm in conformity with variation of the horizontal component of the load moment arm of the combined lever system relative to the pivotal axis of the first lever as the lever system is swung about said pivotal axis, other power means carried by the auxiliary lever and arranged to vary the power effect on said auxiliary lever in conformity with variation of the horizontal component of the load moment arm of the second lever relative to its pivotal axis as the second lever is swung thereon.

14. An equipoising device including a support, a lever pivoted intermediate its ends to said support and having a load arm and a power arm, a second lever pivoted intermediate its ends to the end of the load arm of the first lever, the pivots of the first and second levers being parallel, a load carried by the extremity of the load arm of the second lever, an auxiliary lever pivoted to the support coaxially with the pivot of the first lever, a linkage connecting the power arm of the second lever with the auxiliary lever to hold the two in parallelism, a tension spring having one end anchored to said support and its other end connected to the extremity of the power arm of said first lever and arranged to vary the power effect on said power arm in conformity with variation of the horizontal component of the load moment arm of the combined lever system relative to the pivotal axis of the first lever as the lever system is swung about said pivotal axis, a second tension spring having one end anchored to the support and its other end connected to the auxiliary lever and arranged to vary the power effect on said auxiliary lever in conformity with variation of the horizontal component of the load moment arm of the second lever relative to its pivotal axis as the second lever is swung thereon.

GEORGE CARWARDINE.